United States Patent
Hale et al.

(10) Patent No.: US 6,355,751 B1
(45) Date of Patent: Mar. 12, 2002

(54) CURABLE COATINGS WITH IMPROVED ADHESION TO GLASS

(75) Inventors: Arturo Hale, New York, NY (US); Lee Landis Blyler, Jr., Basking Ridge; Sanjay Patel, New Providence, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 08/774,562

(22) Filed: Dec. 31, 1996

(51) Int. Cl.⁷ .................................................. C08F 30/08
(52) U.S. Cl. ...................................................... 526/279
(58) Field of Search ......................... 526/279; 428/447; 385/123; 522/99, 148

(56) References Cited

U.S. PATENT DOCUMENTS

| 4,801,658 A | * | 1/1989 | Furukawa et al. | 525/450 |
| 4,810,767 A | * | 3/1989 | Furukawa et al. | 526/279 |
| 4,889,768 A | * | 12/1989 | Yokoshima et al. | 428/429 |
| 5,314,975 A | * | 5/1994 | Babirad et al. | 526/248 |
| 5,696,179 A | * | 12/1997 | Chawla | 522/90 |

FOREIGN PATENT DOCUMENTS

| EP | 0 196 645 | 10/1986 |
| EP | 0 336 474 | 10/1989 |
| EP | 0 566 801 | 10/1993 |
| EP | 0 676 420 | 10/1995 |
| EP | 0 690 108 | 1/1996 |
| FR | 1 456 964 | 1/1967 |
| WO | WO 90 13523 | 11/1990 |

OTHER PUBLICATIONS

"Preparation of Cross–Linkable Polymers Based on Alkoxy Silane Monomers" Research Disclosure, No. 357, Jan. 1994, Emsworth, GB, p. 28 XP000425354.

* cited by examiner

Primary Examiner—Margaret G. Moore

(57) ABSTRACT

A composition useful for making a coated optical fiber wherein the composition comprises a photocurable or E-beam curable composition having an alkoxysilane functionality attached through a long backbone.

18 Claims, 1 Drawing Sheet

CURABLE COATINGS WITH IMPROVED ADHESION TO GLASS

FIELD OF THE INVENTION

The present invention relates to curable materials which are derived from (meth)acrylates and alkoxy-substituted organosilanes. A compound containing an alkoxy-substituted organosilane group is covalently attached to a relatively long molecule that has (meth)acrylate functionality. As part of a photo-curable formulation, this long chain provides improved adhesion to glass substrates by covalently tying the polymeric network to the glass substrate.

BACKGROUND OF THE INVENTION

Photo-curing formulations used as coatings for glass optical fibers typically contain adhesion promoters to improve the adhesion between the polymer layer and the glass substrate. The most common kind of adhesion promoters (also known as coupling agents) consists of alkoxy-substituted organosilanes that have another reactive group capable of reacting with the polymerizable coating (Plueddemann, "Silane Coupling Agents", Plenum, 1982). The alkoxysilane group can react with Si—OH groups present on the glass surface. Thus, the coupling agent provides a covalent linkage between the glass surface and the polymeric coating. U.S. Pat. No. 5,146,531 discloses several suitable organofunctional silanes for use in optical fiber coatings, such as amino-functional silanes, mercapto-functional silanes, methacrylate-functional silanes, acrylamido-functional silanes, allyl-functional silanes, vinyl-functional silanes and acrylate-functional silanes. These silanes are preferably methoxy- or ethoxy-substituted. Some preferred organofunctional silanes include 3 aminopropyltriethoxysilane, 3-methacryloxypropyltrimetoxysilane, 3-mercaptopropyl trimethoxysilane, and 3-mercaptopropyltriehtoxysilane. WO 91/03503 and U.S. Pat. No. 4,849,462 disclose the use of mercaptan-functional alkoxysilanes as preferred adhesion promoters (e.g. 3-mercaptopropyl trimethoxysilane, also known as γ-mercaptopropyl trimethoxysilane).

The adhesion promoter is typically added to the photo-curable formulation (usually a mixture of acrylate monomers and oligomers) in amounts from about 0.1% by weight to about 5% by weight. During radiation exposure, the adhesion promoter reacts with the polymerizing mixture, getting incorporated into the polymer network. After radiation exposure the adhesion promoter molecules are tied to the polymer network. Only a small percent of these tied adhesion promoter molecules are close enough to the glass surface to react with it. Thus, the vast majority of adhesion promoter molecules are ineffective because they cannot reach the glass since they are constrained by being attached to the polymer network.

It is an object of the present invention to provide a method to improve the adhesion of photo-curable coatings to glass.

SUMMARY OF THE INVENTION

The present invention comprises covalently attaching an alkoxysilane molecule to a relatively long molecule that is part of a photo-curable formulation and that can copolymerize with this formulation upon photo-irradiation. After the long molecule reacts through radiation exposure, the alkoxysilane functionalities are tied to the network through the relatively long backbone. The long length of this backbone gives the alkoxysilane groups a higher probability to reach and react with the glass surface as compared to traditional adhesion promoters that are randomly linked to the polymer network.

DETAILED DESCRIPTION OF THE INVENTION

The present invention more specifically relates to a method to improve the adhesion of photo-curable polymeric coatings to glass substrates such as glass optical fibers by using a more effective adhesion promoter. It should be noted that the present compositions are used as coatings for glass substrates such as fibers and the term coating where appropriate encompasses but does not exclusively include cladding of glass fibers. In the case of a cladding, the coating has a lower refractive index than the (glass) fiber and can therefore be used as a cladding in the optical sense to guide electromagnetic wave energy within the fiber.

Photo-curable coatings for optical fibers generally comprise a (meth)acrylated oligomer, one or more (meth)acrylate monomers, optionally other monomers that can copolymerize with (meth)acrylates, a photoinitiator, and other additives. The present invention comprises the use of an adhesion promoter with the following formula:

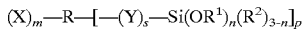

where X contains a functional group capable of reacting with a (meth)acrylate group; R is a relatively long chain radical whose molecular weight is at least 500; Y is an atom or group of atoms whose structure depends on the chemistry used to attach Si to R; $R^1$ and $R^2$ are independently Alkyl groups; $m \geq 1$, $n \geq 1$, $p \geq 1$, and s can be 0 or 1.

The preferred structure of X contains a (meth)acrylate group:

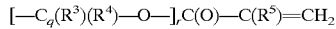

wherein $R^3$, $R^4$, and $R^5$ are independently hydrogen, methyl, ethyl or propyl, q is an integer from 1 to 10, r is either zero or an integer from 1 to 10. A specific example of a preferred X is

Other examples of adequate structures for X include, for example, ethylenically unsaturated groups, such as vinyl and allyl functionalities.

$R^1$ is preferably a methyl or an ethyl group, $R^2$ is preferably a methyl or an ethyl group, and n is preferably 3. The preferred values for m and p are 1.

There is no special requirement as to the chemical nature of R, as long it is compatible with the photo-curing formulation and it does not interfere with the curing reaction. Its preferred molecular weight is at least 1,500. A preferred structure of R is

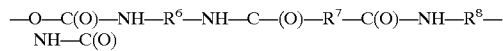

wherein $R^6$ and $R^8$ are independently linear, branched or cyclic alkylene of from six to twenty carbon atoms that may or may not contain aromatic rings. Some exemplary structures of $R^7$ include perfluoropolyethers such as

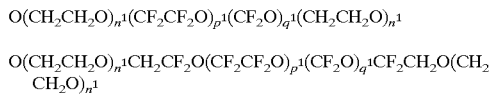

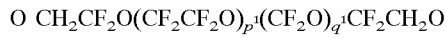

wherein $$0 \leq n^1 \leq 5, \; 0.2 \leq p^1/c^1 \leq 5$$

and the actual values of $p^1$ and $q^1$ are such that the molecular weight of the fluorinated diol is between 500 and 10,000 and wherein the repeating fluorinated ether groups maybe random or block repeating units polyethers, such as $$—O—(CH_2—CH_2—O)_{r^{11}}—$$

$$—O—[CH(CH_3)—CH_2—O]_{r^{11}}—$$

$$—O—(CH_2—CH_2—CH_2—CH_2—O)_{r^{11}}—;$$

polyesters, such as $$—O—[R^9O—C(O)—R^{10}—C(O)—O]_{p^{11}}—R^9—O—;$$

polycarbonates such as $$—O—[R^{11}—O—C(O)—O]_{r^{11}};$$

or end-capped hydrocarbon chains, such as $$—O—R^{12}—O—$$

In the preceding structures, $R^9$, $R^{10}$ and $R^{11}$ are independently linear, branched or cyclic alkylene of from six to twenty carbon atoms that may or may not contain aromatic rings. $R^{12}$ is a linear or branched hydrocarbon chain that may or may not contain unsaturated bonds, and whose molecular weight is at least 500, and preferably at least 1,500. The value of $r^{11}$ in the preceding structures is such that the molecular weight of $R^7$ is at least 500, preferably at least 1,500.

The structure of Y depends on the structure of the silane starting material and the chemical reaction used to attach it to the pre-polymer R. A general structure of Y that can be used with the R structure shown previously is $$—NH—R^{13}—$$

where $R^{13}$ is an alkylene chain. A preferred structure for $R^{13}$ is $—[CH_2]_3—$.

Alternately, the structure of Y could be chosen to be $$—C(O)—NH—R^{13}—$$

in which case—the structure of R mentioned earlier would be replaced by the following structure $$—O—C(O)—NH—R^6—NH—C(O)—R^7—$$

Yet another possibility is for the value of s in the adhesion promoter molecule to be zero. In this case, the structure of R would be either

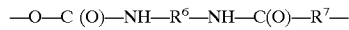

or

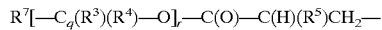
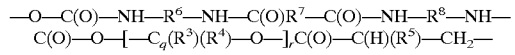

The most convenient way to ensure that R is compatible with the photo-curable formulation is to use the same backbone as the component with the largest molecular weight in this formulation (i.e. the urethane oligomer). Using this same backbone is also desirable because the synthesis is more convenient.

An example of one possible way to synthesize such a long-chain adhesion promoter can be described as follows. The starting point is an α,ω-dihydroxy oligomer. This material is reacted with a di-isocyanate, obtaining an isocyanate endcapped oligomer. This oligomer in turn can react with a hydroxy functional (meth)acrylate and an amine-functional alkyloxysilane, thus yielding an oligomer molecule with an alkoxysilane group on one end and a (meth)acrylate group on the other end. The reactions employed in this scheme are the well-known isocyanate-hydroxyl reaction to yield a urethane group, and the isocyanate-amine reaction to yield a urea group. These reactions are typically carried out using a tin catalyst such as dibutyltin dilaurate. An alternate way to carry out this procedure is to react first the hydroxy-functional (meth)acrylate with the di-isocyanate to obtain an isocyanate-functional (meth)acrylate. Similarly, the aminosilane can be reacted first with the di-isocyanate to obtain an isocyanate-functional alkoxysilane. Alternately one can use a commercially available isocyanate-functional alkoxysilane. These isocyanate-functional groups can then react with an α,ω-dihidroxy oligomer, to obtain an oligomer with both (meth)acrylate and alkoxysilane functionality.

The advantage of the above procedures is that they parallel the synthesis of acrylated urethane oligomers as disclosed for example in WO 91/03503. Thus an economic way to produce these long chain adhesion promoters is to incorporate their synthesis as part of the acrylated urethane synthesis. The following examples illustrate the synthesis of an acrylated urethane oligomer, as well as the synthesis of an oligomeric adhesion promoter.

The present invention also relates to a method in which an appropriately functional alkoxysilane is incorporated in the synthesis of the di (or poly)-functional (meth)acrylated oligomer in amounts from 0.1 to 50% mole of reactive groups. Specifically, this means when a di(meth)acrylated oligomer is synthesized using the general scheme $$F-R-F+2A-X \rightarrow A-X-F-R-F-X-A$$

or with a similar scheme with intermediate steps:

$$E-R-E+2G-R^2-G \rightarrow G-R^2-G-E-R-E-G-R^2-G$$

$$G-R^2-G-E-R-E-G-R^2-G+2A-X \rightarrow A-X-G-R^2-G-E-R-E-G-R^2-G-X-A$$

then an alkoxysilane-containing molecule with a functional group that can react with E, F, G, or a can be incorporated into the synthesis of the di-(meth)acrylated oligomer to produce a mixture containing di-(meth)acrylated oligomer, and oligomers that have both (meth)acrylate and alkoxysilane functionalities. In the above schemes, R is a prepolymer with functional groups F, or functional groups E, A is a (meth)acrylate group connected to a functional group X than can react with F, and G is a functional group that can react with E.

The present invention will be illustrated by the following non-limiting examples. It is understood that the examples are non-limiting and are capable of variation and modification. The invention is not limited to the precise details set forth in the examples.

EXAMPLE 1

Acrylated Urethane Oligomer

A 200 ml flask was oven dried, evacuated, and filled with Argon (Ar), to which isooctyl acrylate (25 ml), 0.02 weight percent of butylated hydroxytoluene inhibitor (BHT, 0.0464 g in isooctyl acrylate) and isophorone diisocyanate (19.5 g, 0.044 mol) were added. An infrared (IR) spectrum was taken. The temperature of the reaction flask was raised to 40° C. and maintained by a temperature controller. 0.05 weight percent of dibutyltin dilaurate catalyst (0.116 g in isooctyl acrylate) was added. 4-Hydroxybutyl acrylate (12.6 g, 0.088 mol) was dripped in over 15–20 minutes. After two hours, an IR spectrum was taken to confirm loss of half the isocyanate peak (2260 cm$^{-1}$). 4000 MW polypropylene glycol (PPG, 175 g, 0.044 mol) was introduced, and the temperature was raised to 70° C. The endpoint of the reaction was confirmed by IR.

EXAMPLE 2

Oligomeric Adhesion Promoter

A hundred ml three neck flask was oven dried, evacuated, and backfilled with Ar, Isooctyl acrylate (solvent, 20 ml), and isophorone diisocyanate (4.45 g, 0.02 mol) were introduced and an IR spectrum was taken. The temperature of the reaction flask within a heating mantle was raised to 65° C. and maintained with a temperature controller. 0.05 weight percent of dibutylin dilaurate (catalyst) was introduced (0.024 g in isooctyl acrylate). With increased Ar flow, the septum was removed, polypropylene glycol (PPG, MW≈4,000, 40 g 0.01 mol) was added with a large bore syringe without a needle, and the septum was replaced (4000 MW PPG was too viscous to inject through the needle). After two hours reaction time a spectrum was taken, and other spectra were taken at intervals until half the isocyanate peak (2260 cm$^{-1}$) remained. 0.2 weight percent butylated hydroxytoluene inhibitor (BHT, 0.0095 g. in isooctyl acrylate) was added, and 4-hydroxybutyl acrylate was dripped in over 15–20 minutes. After an additional hour, the reaction was monitored by IR until half the remaining isocyanate was consumed. 3-Aminopropyltrimethoxysilane (1.79 g, 0.01 mol) was introduced, and the endpoint of the reaction verified by IR.

The synthesis in the above examples is facilitated by the fact that the two isocyanate groups in the isophorone diisocyanate molecule have different reactivities (one of them is attached to a cycloaliphatic secondary carbon, while the other one is attached to an aliphatic primary carbon). The different reactivities prevent the isocyanate from forming a linear polymer with the diol in the first step of Example 2. Similarly, the different reactivities ensure that only one isocyanate per molecule reacts with hydroxybutyl acrylate in Example 1.

EXAMPLE 3

In order to test the dependence of the oligomeric adhesion promoter effectiveness on the length of the oligomer backbone, a series of oligomeric adhesion promoters with varying backbone molecular weights was prepared, following Example 2. UV-curable formulations similar to optical fiber primary coatings were prepared using these oligomeric adhesion promoters (OAP). The mole fraction of trimethoxysilane groups was held constant in all adhesion promoter-containing formulations. The oligomeric acrylated urethane (from Example 1, referred to as "oligomer") and OAP together made up 50 wt. % of the formulation, ensuring a constant PPG concentration in all formulations. The generalized formulation is given in Table 1.

TABLE 1

Primary Coating Formulations.

| Component | Relative Weight |
| --- | --- |
| Oligomer + OAP | 50 |
| Isooctyl acrylate | 15 |
| Phenoxyethyl acrylate | 4 |
| Tripropyleneglycol diacrylate | 1.9 |
| Irgacure 184 (photoinitiator) | 2 |
| Ethoxylated nonylphenyl acrylate | 30 |

In order to maintain a constant molarity of trimethoxysilane and at the same time a constant weight fraction of overall PPG, it is necessary to change the relative amounts of oligomer and adhesion promoter as the molecular weight of the latter varied (Table 2).

TABLE 2

Weight Percentages of oligomer and adhesion promoter in primary coating formulations

| Formulation | MW of OAP backbone (PPG precursor) | Wt % OAM | Wt % oligomer |
| --- | --- | --- | --- |
| 1 | 4000 | 20.35 | 29.65 |
| 2 | 2000 | 11.80 | 38.20 |
| 3 | 1000 | 7.55 | 42.45 |
| 4 | 425 | 5.10 | 44.90 |
| 5 | Control (no OAP.) | 0 | 50 |

Films (6 mils thick) with the above compositions were drawn on thoroughly cleaned Pyrex plates. All films were cured at a dose of 1±0.03 J/cm$^2$.

Peel Tests. Strips of 0.25 inch adhesive backed copper tape were laid down on the UV-cured film described above, with cuts made on each side of the tape to isolate 0.25 inch wide sections of film for testing. 90 degree peel testing was performed under ambient conditions at a rate of approximately one inch per minute. Data were plotted and peel force values determined from the resulting curves. The following table indicates the measured peel force values as a function of the molecular weight of the PPG precursor used to make each OAP.

TABLE 3

Peel test values as a function of OAP oligomer precursor molecular weight

| OAP MW (PPG precursor) | Peel Force (grams/in) |
|---|---|
| 4000 | 440* |
| 2000 | 400* |
| 1000 | 28 |
| 425 | 40 |
| Control (no A.P.) | 16 |

*indicates cohesive failure

The results in Table 3 show that the long adhesion promoter molecules are considerably more effective than the shorter ones. In fact the adhesion in the 2,000 and 4,000 molecular weight cases was so strong that the films broke before peeling (cohesive failure).

EXAMPLE 4

In order to corroborate that the improved adhesion seen in Example 3 for the OAPs containing PPG backbones of MW≧2,000 was indeed due to the trimethoxysilane functionality attached to the oligomer chain, a series of "mock" oligomeric adhesion promoters was synthesized. The synthesis follows Example 2, except that n-hexyl amine was used instead of aminopropyltrimethoxysilane. Thus, the resulting product had a structure exactly like that of the OAP, except that one end of the chain consisted of a hexyl group instead of a trimethoxysilane group. Adhesion measurements with formulations containing these "mock" OAPs were carried out as in Example 3. The adhesion values for the mock OAPs based on the 4,000 and 2,000 MW PPG precursor were 40 and 32 g/in, respectively. These values are an order of magnitude lower than those obtain with the real OAPS.

Since the reactive end-groups of the prepolymers used as reagents in the syntheses described above usually have equal reactivities, the product will not be pure; it will be a in a statistical mixture containing about 50% of the desired oligomeric adhesion promoter, 25% of diacrylated oligomer, and 25% of an oligomer end-capped on both ends with an organosilane. It is possible, however, to minimize the formation of the latter by-product by choosing the appropriate conditions to synthesize the oligomeric adhesion promoter. The preferred means to do this is to incorporate the synthesis of the oligomeric adhesion promoter into the synthesis of the diacrylated oligomer that will ultimately be used in the final coating formulation. One common way to synthesize the diacrylated oligomer consists of reacting one molecule of prepolymer diol with two molecules of di-isocyanate to form an isocyanate-endcapped prepolymer. This molecule, in turn, is reacted with two molecules of a hydroxyfunctional acrylate to form a diacrylated oligomer. A slight modification of this process can produce the diacrylated oligomer mixed with the right amount of oligomeric adhesion promoter. Starting with the isocyanate-endcapped prepolymer, one can add a small amount of, for example, aminopropyltrimethoxysilane. This can be from 0.1 to 20 mol % of the isocyanate groups. The amine group reacts with the isocyanate group, thus obtaining a prepolymer with alkoxysilane functionality. Since there is a large excess of isocyanate groups, there is little chance that two aminopropyltrimethoxysilane molecules will end up attached to the same prepolymer molecule. The balance of the isocyanate groups can be reacted with, for example, hydroxyethyl acrylate. The product will be a mixture of diacrylated oligomer, oligomeric adhesion promoter (i.e. oligomer molecules that have an acrylate on one end and an alkoxysilane group on the other end), and oligomer endcapped with alkoxysilanes on both ends. However, as opposed to Example 2, in this case the statistics favors the formation of the oligomeric adhesion promoter over the last by-product.

The product distribution is described by a binomial distribution. Thus, if for every mole of isocyanate end groups in the isocyanate-endcapped prepolymer there are x moles of aminopropyltrimethoxysilane, the relative amounts of products will be as follows:

| product | relative amount |
|---|---|
| diacrylated oligomer | $(1 - x)^2$ |
| oligomeric adhesion promoter | $2 \times (1 - x)$ |
| alkoxysilane-terminated oligomer | $x^2$ |

For example, if the isocyanate-terminated oligomer is reacted with 10% equivalents of aminopropyltrimethoxysilane, and 90% equivalents of hydroxyethyl acrylate, the distribution will be

| diacrylated oligomer | 81% |
|---|---|
| oligomeric adhesion promoter | 18% |
| alkoxysilane-terminated oligomer | 1% |

Thus, in the same process one can make the oligomer already mixed with oligomeric adhesion promoter, with a very small amount of by-product.

Equivalent results can be obtained by reacting a hydroxyfunctional acrylate with a di-isocyanate first to form an isocyanate-functional acrylate, and either using an isocyanate-functional alkoxysilane, or making one by reacting an amino-functional silane with a di-isocyanate. The isocyanate-functional alkoxysilane and the isocyanate functional acrylate are then reacted with a hydroxyl-functional prepolymer (with a large excess of hydroxyl groups over isocyanate-functional alkoxysilane). The product distribution can be described by a binomial distribution as explained above.

EXAMPLE 5

Synthesis of Isocyanate-Functional Acrylate 96.14 g isophorone di-isocyanate was mixed with 0.09 g BHT (polymerization inhibitor) and 0.291 g dibutyltin dilaurate (catalyst) in 100 ml ethylhexyl acrylate (solvent). The mixture was heated to 45° C. under dry air. Then, 50.25 g hydroxyethyl acrylate was added gradually with a syringe through a septum. The addition was carried out during a 2 hour period under dry air. The reaction was followed with infrared spectroscopy until half of the NCO groups were consumed. The resulting product was an isocyanate-functional acrylate dissolved in ethylhexyl acrylate.

EXAMPLE 6

Synthesis of Diacrylated Oligomer 28.52 g of α,ω-dihydroxypoly(tetramethylene oxide) (Terathane 2,000; number average molecular weight 2,045)

was mixed with 15.086 g of the product from Example 5. The mixture was heated to 70° C. and allowed to react overnight under dry air. All the NCO groups were consumed. The resulting product is a poly(tetramethyleneoxide) urethane diacrylate.

EXAMPLE 7

Synthesis of Isocyanate-Functional Alkoxysilane and Isocyanate-Functional Acrylate 74.11 g (0.33 moles) of isophorone di-isocyanate was mixed with 65.83 g of ethylhexyl acrylate (solvent), 0.09 g BHT (polymerization inhibitor) and 0.21 ml of dibutyltin-dilaurate. 6 g (0.033 moles) of aminopropyltrimethoxysilane was added over 15 minutes under dry air at 45° C. The disappearance of the $NH_2$ doublet was followed with infrared spectroscopy. 34.8 g (0.2999 moles) of hydroxyethyl acrylate was added to the mixture and reacted at 55° C. for two hours. The resulting product consisted of a mixture of approximately 90 mole % of isocyanate-functional acrylate, and 10 mole % of isocyanate-functional trimethoxysilane dissolved in ethylhexylacrylate.

EXAMPLE 8

Synthesis of Oligomeric Adhesion Promoter and Diacrylated Oligomer 55.09 g of α,ω-dihydroxypoly(tetramethyleneoxide) (Terathane 2,000, MW=2,045) was reacted with 29 g of the product from Example 7 at 70° C. under dry air. The reaction was carried out overnight until all the NCO groups were consumed. The resulting product consisted of a mixture of about 81 mole % diacrylated urethane oligomer and 18 mole % of an oligomer endcapped with an acrylate on one end and a trimethoxysilane on the other end.

EXAMPLE 9

Adhesion Studies

A UV-curable formulation containing the product from Example 8 as well as several control formulations were prepared:

| | |
|---|---|
| Formulation A (control): | 65 parts (wt.) diacrylated oligomer (in ethylhexyl acrylate reactive solvent) from Example 6 |
| | 35 parts (wt.) ethoxylated nonyl phenyl acrylate |
| | 2 parts (wt.) Irgacure 184 photoinitiator |
| Formulation B: | 65 parts (wt.) diacrylated oligomer/oligomeric adhesion promoter (in ethylhexyl acrylate reactive solvent) from Example 8 |
| | 35 parts (wt.) ethoxylated nonyl phenyl acrylate |
| | 2 parts (wt.) Irgacure 184 photoinitiator |
| Formulation C: | 100 parts (wt.) formulation A |
| | 1 part (wt.) mercaptopropyltrimethoxysilane |
| Formulation D: | 100 parts (wt.) formulation A |
| | 1 part (wt.) acryloxypropyltrimethoxysilane |

Formulation A was used as a control without adhesion promoter. Formulations C and D contain standard commercial adhesion promoters. Formulations B, C and D contain 0.0041, 0.0051, and 0.0043 moles of trimethoxysilane per 100 g of formulation, respectively.

Glass microscope slides were cleaned in a concentrated sulfuric acid/nitric acid solution (5% nitric acid), rinsed with deionized water, and air-dried. Films of the above formulations were drawn on the glass slides with a doctor blade (10 mil film thickness), and the films were cured using a dose of 2 $J/cm^2$. Adhesion was measured using a 90° peel test at 5 in/min on samples aged under different conditions.

TABLE 4

| | Adhesion of formulations A–D (g/cm width) after different aging conditions | | |
|---|---|---|---|
| SAMPLE | 14 days dry, 23° C. | 14 days 93% RH, 23° C. | 14 days dry + 24 hrs at 105° C., 100% RH |
| A | 5.4 | 4.1 | 8.5 |
| B | 17 | 20 | 17 |
| C | 7.0 | 7.5 | 7.0 |
| D | 6.7 | 8.5 | 6.5 |

The adhesion of the formulation containing the oligomeric adhesion promoter from the instantaneous invention is more than twice stronger than which can be achieved using equivalent silane molar amounts of commercial adhesion promoters.

This invention is not limited to using isocyanate chemistry to synthesize the adhesion promoter molecule. Any chemical reaction that can be used to attach an alkoxysilane group to one end of a long chain and a (meth)acrylate to the other end of the chain can give an effective adhesion promoter. For example, epoxy-functional prepolymers are typically reacted with acrylic acid to yield acrylated oligomers. Since amines react easily with epoxides, an amine-functional alkoxysilane could be incorporated into the oligomer as described above. Another attractive way to synthesize oligomeric adhesion promoters is to attach directly an alkoxysilane functionality to a diacrylated oligomer. This can be done via a hydrosilylation reaction: a silicon hydride can add directly to the ethylenic unsaturation of the acrylate group using transition metal catalysts such as platinum:

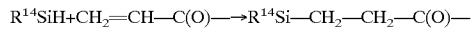

Thus, a diacrylated oligomer can be reacted with a small amount of, for example, trimethoxysilane, to give a product of the form

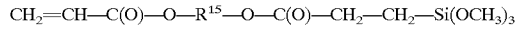

Since there is a large excess of acrylates over silicon hydride groups, the formation of the above molecule will be favored over a molecule with trimethoxysilane groups on both ends.

DETAILED DESCRIPTION

Figure 1:
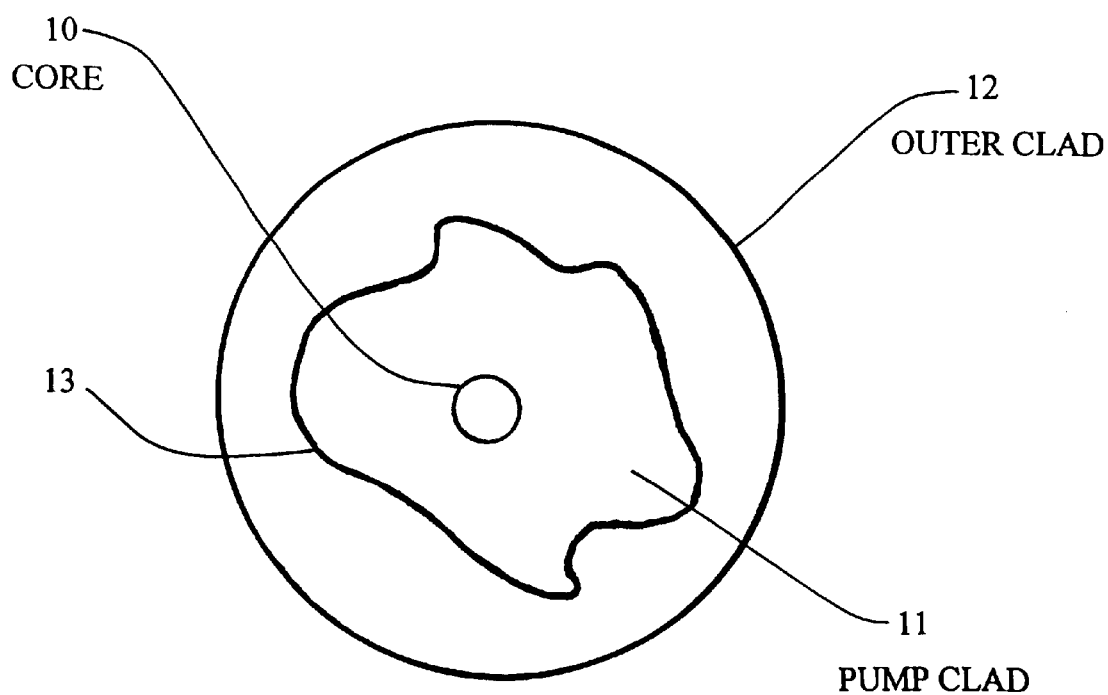
FIG. 1 is a cross-sectional view of a coated fiber structure.

The coated fiber of the present invention can comprise a double-clad structure such as shown in FIG. 1 which consists of a core 10 and a first cladding 11 both generally of a silica-based glass and a polymeric coating or cladding 12 forming an interface 13 with the core material which is usually an inorganic glass structure. The polymeric coating can comprise the cured compositions of the instant invention.

Although the foregoing invention has been described in some detail by way of illustration and example for purposes of clarity of understanding, it will be obvious to those skilled in the art that certain changes and modifications may be practiced without departing from the spirit and scope thereof as described in the specification and as defined in the appended claims.

What is claimed is:

1. A coating composition useful for making an optical fiber comprising
   a photocurable or E-beam curable composition; and
   an adhesion promotor having an alkoxysilane functionality attached through a fluorine containing backbone to a styryl, vinyl naphthyl, vinyl ether, 1-alkenyl ether, allyl, acrylate or methacrylate group capable of co-polymerizing with the photocurable or E-beam curable composition,
   wherein the backbone has a molecular weight of at least about 500 a.m.u.

2. The coating composition of claim 1, wherein the backbone has a molecular weight of at least about 1500 a.m.u.

3. The coating composition of claim 1, wherein the photocurable or E-beam curable composition comprises a (meth)acrylated oligomer and one or more (meth)acrylate monomers that can copolymerize with (meth)acrylates and a photoinitiator.

4. The coating composition of claim 1, wherein the adhesion promotor has the formula:

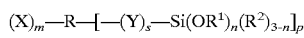

where

| | |
|---|---|
| X | contains a styryl, vinyl naphthyl, vinyl ether, 1-alkenyl ether, allyl, acrylate or methacrylate group, |
| R | is a relatively long fluorine-containing chain radical whose molecular weight is at least 500 a.m.u., |
| Y | is an atom or group of atoms whose structure depends on the chemistry used to attach Si to R, |
| $R^1$ and $R^2$ | are independently alkyl groups, |
| m and p | are independently greater than or equal to 1, |
| s | is either 0 or 1, and |
| n | is 1, 2 or 3. |

5. The coating composition of claim 4, wherein X contains a (meth)acrylate group of the formula:

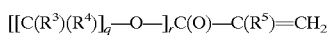

where

| | |
|---|---|
| $R^3$ and $R^4$ | are independently hydrogen, methyl, ethyl or propyl, $R^5$ is independently hydrogen or methyl, |
| q | is an integer from 1 to 10, and |
| r | is an integer from 1 to 10. |

6. The coating composition of claim 4, wherein X is

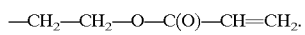

7. The coating composition of claim 4, wherein X is selected from the group consisting of styryl, vinyl naphthyl, vinyl ether, 1-alkenyl ether and allyl group.

8. The coating composition of claim 7, wherein X is selected from the group consisting of 1-propenyl ether and 1-butenyl ether.

9. The coating composition of claim 4, wherein $R^1$ is methyl or ethyl, $R^2$ is methyl or ethyl, n is 3 and m and p are 1.

10. The coating composition of claim 4, wherein R is

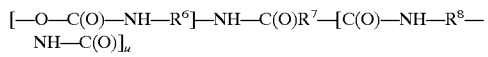

wherein u is either zero or 1, wherein $R^6$ and $R^8$ are independently linear, branched or cyclic alkylene of from six to twenty carbon atoms that may or may not contain aromatic rings; and wherein $R^7$ has a molecular weight between 500 and 10,000 a.m.u. and is a random or block fluorinated polyether, of the formula

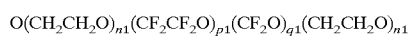

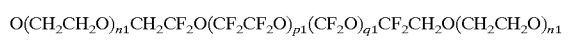

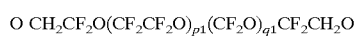

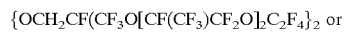

wherein $o \leq n1 \leq 5$, and $0.2 \leq p1/q1 \leq 5$.

11. The coating composition of claim 4, wherein Y is

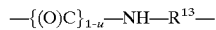

wherein $R^{13}$ is an alkylene chain, and wherein u is either zero or 1.

12. A coated optical fiber comprising a core and a coating made from a cured composition according to claim 5.

13. A coated optical fiber comprising a core and a coating made from a cured composition according to claim 6.

14. A coated optical fiber comprising a core and a coating made from a cured composition according to claim 7.

15. A coated optical fiber comprising a core and a coating made from a cured composition according to claim 8.

16. A coated optical fiber comprising a core and a coating made from a cured composition according to claim 9.

17. A coated optical fiber comprising a core and a coating made from a cured composition according to claim 10.

18. A coated optical fiber comprising a core and a coating made from a cured composition according to claim 11.

* * * * *